US012787005B2

(12) United States Patent
Lu et al.

(10) Patent No.: US 12,787,005 B2
(45) Date of Patent: Nov. 3, 2026

(54) UCI TRANSMISSION METHOD, UCI RECEIVING METHOD, TERMINAL, AND NETWORK DEVICE

(71) Applicant: VIVO MOBILE COMMUNICATION CO., LTD, Guangdong (CN)

(72) Inventors: Zhi Lu, Guangdong (CN); Na Li, Guangdong (CN); Xiaodong Shen, Guangdong (CN); Xiaohang Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 520 days.

(21) Appl. No.: 17/568,734

(22) Filed: Jan. 5, 2022

(65) Prior Publication Data

US 2022/0132496 A1 Apr. 28, 2022

Related U.S. Application Data

(63) Continuation of application No. PCT/CN2020/098831, filed on Jun. 29, 2020.

(30) Foreign Application Priority Data

Jul. 5, 2019 (CN) ......................... 201910605854.5

(51) Int. Cl.
*H04W 72/21* (2023.01)
*H04W 72/23* (2023.01)

(52) U.S. Cl.
CPC .......... *H04W 72/21* (2023.01); *H04W 72/23* (2023.01)

(58) Field of Classification Search
CPC ... H04W 72/21; H04W 72/23; H04W 72/569; H04W 72/0446; H04W 72/20;
(Continued)

(56) References Cited

U.S. PATENT DOCUMENTS

2012/0113831 A1 5/2012 Pelletier et al.
2013/0195122 A1* 8/2013 Li ......................... H04L 5/0055 370/479

(Continued)

FOREIGN PATENT DOCUMENTS

CN 106067845 A 11/2016
CN 108702238 A 10/2018

(Continued)

OTHER PUBLICATIONS

VIVO, "UCI Enhancements for URLLC," 3GPP TSG RAN WG1 #96bis, Agenda item 7.2.6.2, Apr. 8-12, 2019, R1-1904082, Xi'an, China, 11 Pages.

(Continued)

*Primary Examiner* — Chirag G Shah
*Assistant Examiner* — Joshua Smith
(74) *Attorney, Agent, or Firm* — BROOKS KUSHMAN P.C.

(57) ABSTRACT

A UCI transmission method, a UCI receiving method, a terminal, and a network device are provided. The method includes: in a case that a time-domain transmission resource of a first uplink channel carrying first UCI and a time-domain transmission resource of a second uplink channel carrying second UCI are overlapped, multiplexing the first UCI and the second UCI on a same channel for transmission.

5 Claims, 4 Drawing Sheets

(58) Field of Classification Search
CPC ............. H04W 72/56; H04W 72/1268; H04W 72/232; H04L 5/0055; H04L 5/0057; H04L 5/0053; H04L 1/0003; H04L 1/0016; H04L 5/0064
See application file for complete search history.

(56) References Cited

U.S. PATENT DOCUMENTS

| | | | | |
|---|---|---|---|---|
| 2014/0192738 | A1 | 7/2014 | Nam et al. | |
| 2017/0264419 | A1* | 9/2017 | Fakoorian | H04W 72/21 |
| 2018/0007681 | A1* | 1/2018 | Yang | H04W 72/21 |
| 2019/0053218 | A1* | 2/2019 | Kim | H04L 5/0051 |
| 2019/0327726 | A1 | 10/2019 | Zhang et al. | |
| 2019/0363843 | A1* | 11/2019 | Gordaychik | H04L 5/0058 |
| 2019/0364561 | A1* | 11/2019 | Xiong | H04W 72/21 |
| 2020/0274637 | A1 | 8/2020 | Li et al. | |
| 2020/0403735 | A1 | 12/2020 | Zhao | |
| 2021/0144702 | A1 | 5/2021 | Zhao | |
| 2021/0298008 | A1* | 9/2021 | Yamamoto | H04L 5/0053 |
| 2021/0377991 | A1* | 12/2021 | Takeda | H04W 72/569 |
| 2022/0053483 | A1* | 2/2022 | Yoshioka | H04W 72/21 |
| 2022/0103330 | A1* | 3/2022 | Li | H04L 5/0057 |

FOREIGN PATENT DOCUMENTS

| | | | |
|---|---|---|---|
| CN | 108702776 | A | 10/2018 |
| CN | 109155726 | A | 1/2019 |
| CN | 109802813 | A | 5/2019 |
| EP | 2993861 | A1 | 3/2016 |
| WO | 2018127131 | A1 | 7/2018 |
| WO | 2019039843 | A1 | 2/2019 |
| WO | 2019098697 | A1 | 5/2019 |

OTHER PUBLICATIONS

Extended European Search Report for European Application No. 20836300.2-1213, dated Aug. 2, 2022, 13 Pages.
First Office Action for Indian Application No. 202227005204, dated Jun. 22, 2022, 6 Pages (including English Translation).
International Search Report and Written Opinion for Application No. PCT/CN2020/098831, dated Oct. 9, 2020, 5 Pages.
First Office Action for Chinese Application No. 201910605854.5, dated Apr. 6, 2021, 8 Pages.
Huawei et al., "Intra-UE UCI Multiplexing," 3GPP TSG RAN WG1 Meeting #95, Agenda Item 7.2.6.4, Nov. 12-16, 2018, R1-1813664, Spokane, WA, USA, 3 Pages.
Huawei et al., "UCI Enhancements for URLLC," 3GPP TSG RAN WG1 Meeting #97, Agenda Item 7.2.6.2, May 13-17, 2019, R1-1906058, Reno, NV, USA, 10 Pages.
Huawei et al., "UL Intra-UE Multiplexing Between Control Channels," 3GPP TSG RAN WG1 Meeting #97, Agenda Item 7.2.6.7, May 13-17, 2019, R1-1907547, Reno, NV, USA, 4 Pages.
First Office Action for Korean Application No. 10-2022-7003455, dated Apr. 25, 2024, 6 Pages.
ZTE "UCI multiplexing on PUSCH" 3GPP TSG RAN WG1 Meeting #89, Hangzhou, China, May 2017, R1-1707173, 5 Pages.
Nokia, Nokia Shanghai Bell "Summary of Thursday offline discussion on UL/DL intra-UE prioritization/multiplexing" 3GPP TSG-RAN WG1 #96, Athens, Greece, Feb. 2019, R1-1903766, 30 Pages.
OPPO "Summary#2 on UCI enhancements for URLLC" 3GPP TSG RAN WG1 #97, Reno, USA, May 2019, R1-1907777, 20 Pages.
Second European Office Action for European Patent Application No. 20836300.2 mailed Nov. 12, 2025. 9 pages.
3rd Generation Partnership Project, Technical Specification; Multiplexing and channel coding. 3GPP TS 38.212 version 15.4.0 Release 15. Online. Apr. 2019. 103 pages.

* cited by examiner

UCI TRANSMISSION METHOD, UCI RECEIVING METHOD, TERMINAL, AND NETWORK DEVICE

CROSS-REFERENCE TO RELATED APPLICATION

This application is continuation application of PCT International Application No. PCT/CN2020/098831 filed on Jun. 29, 2020, which claims priority to Chinese Patent Application No. 201910605854.5, filed on Jul. 5, 2019 in China, the disclosures of which are incorporated herein by reference in their entireties.

TECHNICAL FIELD

The present disclosure relates to the field of communications technologies, and in particular, to an uplink control information (UCI) transmission method, a UCI receiving method, a terminal, and a network device.

BACKGROUND

In some communications systems, a terminal can support transmission of a plurality of services at the same time. For example, in a 5G communications system, a terminal supports not only an ultra reliable low latency communications (URLLC) service, but also a large-capacity and high-rate enhanced mobile broadband (eMBB) service. In this case, there may be a plurality of pieces of overlapped uplink control information (UCI) transmitted on a time-domain resource (for example, a slot), resulting in a UCI transmission conflict which leads to a poor UCI transmission effect of the terminal.

SUMMARY

Embodiments of the present disclosure provide a UCI transmission method, a UCI receiving method, a terminal, and a network device.

According to a first aspect, an embodiment of the present disclosure provides a UCI transmission method, applied to a terminal and including:

in a case that a time-domain transmission resource of a first uplink channel carrying first UCI and a time-domain transmission resource of a second uplink channel carrying second UCI are overlapped, multiplexing the first UCI and the second UCI on a same channel for transmission.

According to a second aspect, an embodiment of the present disclosure provides a UCI receiving method, applied to a network device and including:

in a case that a time-domain transmission resource of a first uplink channel carrying first UCI and a time-domain transmission resource of a second uplink channel carrying second UCI are overlapped, receiving the first UCI and the second UCI on a same channel.

According to a third aspect, an embodiment of the present disclosure provides a terminal, including:

a transmission module, configured to: in a case that a time-domain transmission resource of a first uplink channel carrying first UCI and a time-domain transmission resource of a second uplink channel carrying second UCI are overlapped, multiplex the first UCI and the second UCI on a same channel for transmission.

According to a fourth aspect, an embodiment of the present disclosure provides a network device, including:

a receiving module, configured to: in a case that a time-domain transmission resource of a first uplink channel carrying first UCI and a time-domain transmission resource of a second uplink channel carrying second UCI are overlapped, receive the first UCI and the second UCI on a same channel.

According to a fifth aspect, an embodiment of the present disclosure provides a terminal, including a memory, a processor, and a program stored in the memory and executable on the processor, where when the program is executed by the processor, the steps of the UCI transmission method provided in the embodiments of the present disclosure are implemented.

According to a sixth aspect, an embodiment of the present disclosure provides a network device, including a memory, a processor, and a program stored in the memory and executable on the processor, where when the program is executed by the processor, the steps of the UCI receiving method provided in the embodiments of the present disclosure are implemented.

According to a seventh aspect, an embodiment of the present disclosure provides a computer-readable storage medium, where the computer-readable storage medium stores a computer program, and when the computer program is executed by a processor, the steps of the UCI transmission method or the UCI receiving method provided in the embodiments of the present disclosure are implemented.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in this specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in this specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. A UCI transmission method, a UCI receiving method, a terminal, and a network device provided in the embodiments of the present disclosure may be applied to a wireless communications system. The wireless communications system may be a new radio (NR) system, an evolved long term evolution (eLTE) system, a long term evolution (LTE) system, a subsequent evolved communications system, or the like.

Figure 1:
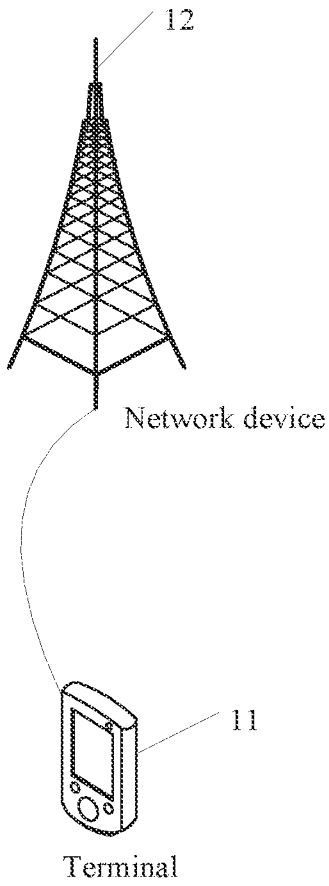
FIG. 1 is a structural diagram of a network system to which an embodiment of the present disclosure can be applied.

FIG. 1 is a structural diagram of a network system to which an embodiment of the present disclosure can be applied. As shown in FIG. 1, the network system includes: a terminal 11 and a network device 12, where the terminal 11 may be user equipment (UE) or another terminal side device, for example, a terminal side device such as a mobile phone, a tablet personal computer, a laptop computer, a personal digital assistant (PDA), a mobile Internet device (MID), a wearable device, or a robot. It should be noted that a specific type of the terminal 11 is not limited in the embodiment of the present disclosure. The network device 12 may be a base station in 4G, 5G, or later releases, or a base station in other communications systems, or is referred to as a Node B, an Evolved Node B, a transmission reception point (TRP), an access point (AP), or other words in the field, as long as the same technical effect is achieved. The network device is not limited to specific technical words. In addition, the network device 12 may be a master node (MN) or a secondary node (SN). It should be noted that in embodiments of the present disclosure, only the 5G base station is used as an example, but a specific type of the network device is not limited.

Figure 2:
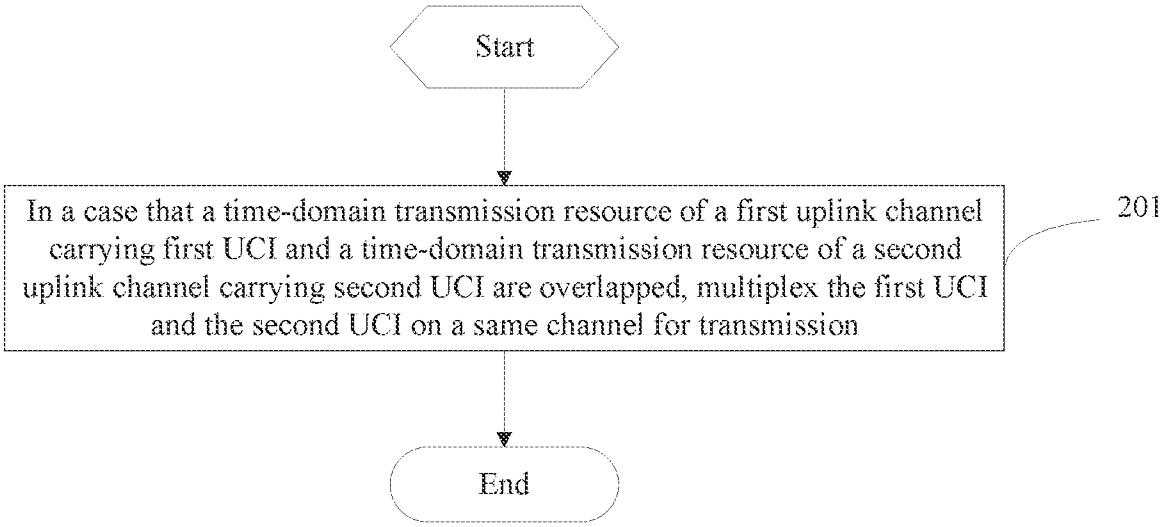
FIG. 2 is a flowchart of a UCI transmission method according to an embodiment of the present disclosure.

FIG. 2 is a flowchart of a UCI transmission method according to an embodiment of the present disclosure. The method is applied to a terminal, and as shown in FIG. 2, includes the following steps:

Step 201: In a case that a time-domain transmission resource of a first uplink channel carrying first UCI and a time-domain transmission resource of a second uplink channel carrying second UCI are overlapped, multiplex the first UCI and the second UCI on a same channel for transmission.

The first UCI and the second UCI may be UCI of different services. For example, the first UCI is UCI of a first service, and the second UCI is UCI of a second service. In addition, in this embodiment of the present disclosure, the UCI includes but is not limited to at least one of a hybrid automatic repeat request acknowledgement (HARQ-ACK), channel state information (CSI), a scheduling request (SR), or the like.

In addition, in this embodiment of the present disclosure, the first service may be a URLLC service, and the second service may be an eMBB service. Certainly, this is not limited in this embodiment of the present disclosure. For example, the first service or the second service may be a massive machine type communication (mMTC) service, or the first service and the second service may alternatively be different services introduced in subsequent communications systems. In this embodiment of the present disclosure, that the first service is a URLLC service and the second service is an eMBB service is mainly used as an example for description.

Moreover, the first uplink channel and the second uplink channel may be physical uplink control channels (PUCCH). For example, a PUCCH carrying the first UCI may be referred to as a first PUCCH, and a PUCCH carrying the second UCI may be referred to as a second PUCCH. Certainly, the first uplink channel and the second uplink channel may alternatively be physical uplink shared channels (PUSCH). For example, a PUSCH carrying the first UCI may be referred to as a first PUSCH, and a PUSCH carrying the second UCI may be referred to as a second PUSCH.

Figure 3:
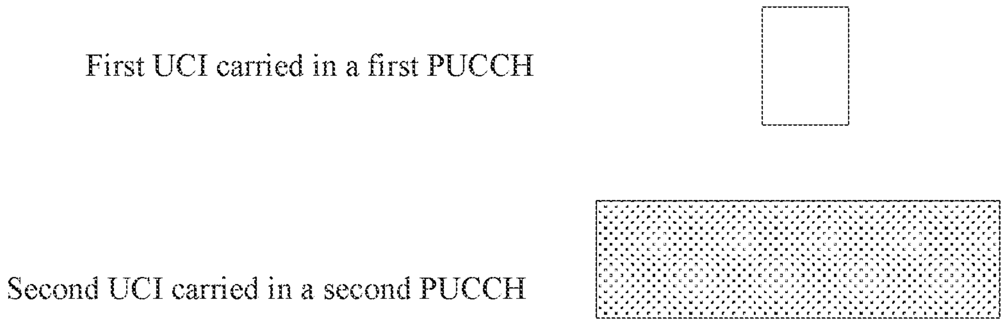
FIG. 3 is a schematic diagram of a time-domain transmission resource according to an embodiment of the present disclosure.

In addition, that a time-domain transmission resource of a first uplink channel carrying first UCI and a time-domain transmission resource of a second uplink channel carrying second UCI are overlapped may be: the time-domain transmission resource of the first uplink channel and the time-domain transmission resource of the second uplink channel are partially or completely overlapped. For example, as shown in FIG. 3, the time-domain transmission resource of the first PUCCH and the time-domain transmission resource of the second PUCCH are overlapped.

Moreover, the multiplexing the first UCI and the second UCI on a same channel for transmission may be: multiplexing all or some bits of the first UCI and the second UCI on the same channel for transmission. For example, multiplexing all bits of the first UCI and all or some bits of the second UCI on the first uplink channel for transmission. Certainly, in some cases, one of the first UCI and the second UCI may be discarded, to guarantee transmission of the other UCI. For example, all or some of the bits of the second UCI may be discarded in a case that all bits of the first UCI and the second UCI are not allowed to be transmitted due to a maximum code rate of the first uplink channel. In addition, the foregoing transmission may be sent to a network device.

In this embodiment of the present disclosure, the multiplexing the first UCI and the second UCI on a same channel for transmission can be implemented by performing the foregoing step, thereby avoiding a UCI transmission conflict, to improve a UCI transmission effect of the terminal.

As an optional implementation, the same channel is the first uplink channel.

In this case, transmission can be implemented by using one of the first uplink channel and the second uplink channel, instead of adding a channel. This reduces complexity.

Optionally, a priority of the first UCI is higher than a priority of the second UCI.

For example, the first UCI is UCI of a URLLC service, and the second UCI is UCI of an eMBB service. In this case, the first UCI and the second UCI can be multiplexed and transmitted on an uplink channel corresponding to the UCI of the higher priority, to ensure that not only the UCI of the higher priority but also the UCI of the lower priority can be transmitted.

The priorities of the UCI may be determined based on corresponding physical signaling, that is, priorities of different pieces of UCI can be differentiated based on physical signaling. For example, the priorities are determined based on downlink control information (DCI) corresponding to the UCI. Optionally, DCI corresponding to the first UCI is:

DCI with a specific format, DCI scrambled with a specific radio network temporary identifier (RNTI), or DCI configured with a specific modulation and coding scheme (MCS) table.

The DCI corresponding to the first UCI may be DCI associated with a service of the first UCI, for example, associated DCI used to schedule transmission of the service or configure the transmission of the service.

In this case, the priorities of the UCI may be determined using a DCI format, DCI scrambled with an RNTI, DCI configured with an MCS table, or the like. For example, the UCI (including a HARQ-ACK, an SR, and CSI) of the higher priority means UCI corresponding to the following:

DCI with a specific format;

DCI scrambled with a specific RNTI; or

DCI configured with a specific MCS table.

For example, the UCI (including a HARQ-ACK, an SR, and CSI) of the lower priority means UCI corresponding to the following:

DCI with another DCI format different from the specific format;

DCI scrambled with another RNTI different from the specific RNTI; or

DCI configured with another MCS table different from the specific MCS table.

In addition, in this embodiment of the present disclosure, the DCI with the specific format may be DCI with a preset format, for example, a network configuration or a protocol agreement. The DCI scrambled with the specific RNTI may be DCI scrambled with a preset RNTI, for example, a network configuration or a protocol agreement, such as DCI scrambled with a modulation and coding scheme cell radio network temporary identifier (MCS-C-RNTI). The DCI configured with the specific MCS table may be DCI configured with a preset MCS table, for example, DCI configured with an MCS table of a network configuration or a protocol agreement, such as an MCS table of low spectrum efficiency.

In this implementation, because the priorities of the UCI can be determined based on corresponding DCI, an additional indication can be avoided to reduce costs.

As an optional implementation, in the case that the first uplink channel is the first PUCCH and the second uplink channel is the second PUCCH, the multiplexing the first UCI and the second UCI on a same channel for transmission includes:

multiplexing, for transmission, the first UCI and the second UCI on a PUCCH resource of a first PUCCH carrying the first UCI.

In this implementation, in a case that the first UCI and the second UCI are carried in a PUCCH for transmission, the first UCI and the second UCI are multiplexed, for transmission, on the PUCCH resource of the first PUCCH carrying the first UCI. For example, in a case that a HARQ-ACK of URLLC and a HARQ-ACK of eMBB are transmitted on a PUCCH, a PUCCH resource of URLLC is used to carry the HARQ-ACK of URLLC and the HARQ-ACK of eMBB.

The PUCCH resource may be determined based on a total bit quantity of the multiplexing.

Optionally, the total bit quantity includes:

the sum of a bit quantity of the first UCI and a bit quantity of the second UCI; or the sum of the bit quantity of the first UCI and a commuted bit quantity of the second UCI, where the commuted bit quantity of the second UCI is a function of the bit quantity of the second UCI.

The foregoing function may be a preset function, for example, a function agreed in a protocol or configured in a network. For example, the foregoing function may be obtained by multiplying an actual bit quantity by a commutation factor. In other words, the commuted bit quantity of the second UCI is equal to a bit quantity obtained by multiplying an actual bit quantity of the second UCI by the commutation factor. The commutation factor may be preconfigured, for example, agreed in a protocol or configured in a network.

It should be noted that, in this embodiment of the present disclosure, after the total bit quantity is determined, a manner of determining the PUCCH resource is not limited. For example, the manner may be: first, determining, based on the total bit quantity, a PUCCH resource set including the foregoing PUCCH resource, and determining the foregoing PUCCH resource from the PUCCH resource set. Specifically, the manner may be a PUCCH resource determining manner defined in a protocol or a PUCCH resource determining manner subsequently introduced in the protocol. Because the PUCCH resource can be determined based on a total bit quantity of the multiplexing, resource waste is avoided.

In the following, that the first UCI is a HARQ-ACK of URLLC and the second UCI is a HARQ-ACK of eMBB is used as an example for description. In this case, determining the PUCCH resource set may be implemented based on the following:

a total quantity of bits of the HARQ-ACK of URLLC and the HARQ-ACK of eMBB, or the sum of a quantity of bits of the HARQ-ACK of URLLC and a commuted quantity of bits of the HARQ-ACK of eMBB.

The details may be as follows:

the PUCCH resource set is determined based on the sum of the quantity of bits of the HARQ-ACK of URLLC and the commuted quantity of bits of the HARQ-ACK of eMBB. In a commutation manner, the commuted quantity of bits of the HARQ-ACK of eMBB is obtained as follows:

eMBB HARQ-ACK bit quantity*(MaxCodeRate 1 (for URLLC)/MaxCodeRate 2 (for eMBB)), where MaxCodeRate 1 (for URLLC) and MaxCodeRate 2 (for eMBB) are a maximum code rate of a PUCCH configured by a high layer and used to transmit a URLLC service and that of a PUCCH configured by the high layer and used to transmit an eMBB service, respectively.

In addition, in the foregoing implementation, a quantity of first physical resource blocks (PRB) used by the first UCI in the PUCCH resource may be a minimum PRB quantity that does not exceed a maximum code rate of a first PUCCH format; and a quantity of second PRBs used by the second UCI in the PUCCH resource may be a minimum PRB quantity that does not exceed a maximum code rate of a second PUCCH format.

In addition, in a case that the second PRB quantity is greater than a third PRB quantity, bits of the second UCI can be discarded until the second PRB quantity is less than or equal to the third PRB quantity, where the third PRB quantity is equal to a value obtained by subtracting the first PRB quantity from a maximum PRB quantity of the PUCCH resource.

The first PUCCH format is a PUCCH format used by the first UCI. The second PUCCH format is a PUCCH format used by the second UCI.

For example, the first UCI is a HARQ-ACK of URLLC, and the second UCI is a HARQ-ACK of eMBB. After the PUCCH resource set is determined, a quantity of RBs in the PUCCH resource set may be determined according to the following rules:

in a case that the terminal uses a PUCCH format 2 or format 3 including $$M_{RB}^{PUCCH}$$

PRBs to transmit $O_{ACK1}$ URLLC information bits and $O_{CRC1}$ bits, for PRBs required by a URLLC HARQ-ACK, the terminal determines a minimum PRB quantity that is less than or equal to a configuration and that is configured, by a high layer, for nrofPRBs1 of PUCCH-format2 or nrofPRBs1 of PUCCH-format3:

$$M_{RB,\min 1}^{PUCCH}$$

meets $$(O_{ACK1} + O_{CRC1}) \le M_{RB,min1}^{PUCCH} \cdot N_{sc,ctrl1}^{RB} \cdot N_{symb-UCI1}^{PUCCH} \cdot Q_{m1} \cdot r1.$$

In addition, in a case that $$M_{RB}^{PUCCH} > 1 (O_{ACK1} + O_{CRC1}) > \left(M_{RB,min1}^{PUCCH} - 1\right) \cdot N_{sc,ctrl1}^{RB} \cdot N_{symb-UCI1}^{PUCCH} \cdot Q_{m1} \cdot r1.$$

$O_{ACK1}$ denotes a quantity of bits of a HARQ-ACK of URLLC;

$$N_{sc,ctrl1}^{RB}$$

denotes a quantity of subcarriers;

$$N_{symb-UCI1}^{PUCCH}$$

denotes a quantity of symbols occupied by UCI; $Q_{m1}$ denotes a modulation mode of UCI of a PUCCH of URLLC; and r1 denotes a maximum code rate MaxCodeRate 1 (for URLLC) configured for a PUCCH of a URLLC service.

However, for PRBs required by an eMBB HARQ-ACK, the terminal determines a minimum PRB quantity that is less than or equal to a configuration and that is configured, by the high layer, for nrofPRBs2 of PUCCH-format2 or nrofPRBs2 of PUCCH-format3:

$$M_{RB,min2}^{PUCCH}$$

meets $$(O_{ACK2} + O_{CRC2}) \le M_{RB,min2}^{PUCCH} \cdot N_{sc,ctrl2}^{RB} \cdot N_{symb-UCI2}^{PUCCH} \cdot Q_{m2} \cdot r2.$$

In addition, in a case that $$M_{RB}^{PUCCH} > 1,$$

$$(O_{ACK2} + O_{CRC2}) > \left(M_{RB,min2}^{PUCCH} - 1\right) \cdot N_{sc,ctrl2}^{RB} \cdot N_{symb-UCI2}^{PUCCH} \cdot Q_{m2} \cdot r2,$$
$$\text{and } M_{RB,min2}^{PUCCH} \le nrofPRBs1 - M_{RB,min1}^{PUCCH}.$$

$O_{ACK2}$ denotes a quantity of bits of a HARQ-ACK of eMBB;

$$N_{sc,ctrl2}^{RB}$$

denotes a quantity of subcarriers;

$$N_{symb-UCI2}^{PUCCH}$$

denotes a quantity of symbols occupied by UCI; $Q_{m2}$ denotes a modulation mode of UCI of a PUCCH of eMBB; and r2 denotes a maximum code rate MaxCodeRate 2 (for eMBB) configured for a PUCCH of an eMBB service.

nrofPRBs1 may be equal to or different from nrofPRBs2.

In a case that $$M_{RB,min2}^{PUCCH} > nrofPRBs1 - M_{RB,min1}^{PUCCH},$$

some or all bits of the HARQ-ACK of eMBB are discarded until $$(O_{ACK2'} + O_{CRC2'}) = \left(nrofPRBs1 - M_{RB,min1}^{PUCCH}\right) \cdot N_{sc,ctrl2}^{PUCCH} \cdot N_{symb-UCI2}^{PUCCH} \cdot Q_{m2} \cdot r2.$$

In a case that $$(O_{ACK1} + O_{CRC1}) > \left(M_{RB}^{PUCCH} - 1\right) \cdot N_{sc,ctrl1}^{RB} \cdot N_{symb-UCI1}^{PUCCH} \cdot Q_{m1} \cdot r1,$$

the terminal transmits, by using $$M_{RB}^{PUCCH}$$

PRBs, bits of the HARQ-ACK of URLLC that are used for transmitting the PUCCH of URLLC; and discards the HARQ-ACK of eMBB.

In the foregoing process, the terminal respectively determines a quantity of PRBs required by the first PUCCH for carrying the first UCI and a quantity of PRBs required by the first PUCCH for carrying the second UCI. Maximum quantities of PRBs required by the first UCI and the second UCI do not exceed a maximum allowed PRB quantity of a resource set including the first PUCCH. Optionally, in the foregoing implementation in which the first UCI and the second UCI are multiplexed, for transmission, on the PUCCH resource of the first PUCCH carrying the first UCI, the first UCI and the second UCI may be coded jointly or independently. In addition, different code rates or a same code rate may be used. For example:

In a case that the first UCI and the second UCI are coded jointly, and a code rate of the joint coding exceeds a maximum code rate of the first PUCCH, bits of the second UCI are discarded until the code rate of the joint coding does not exceed the maximum code rate of the first PUCCH.

Alternatively, in a case that the first UCI and the second UCI are coded respectively and independently, and a post-coding code rate of the second UCI exceeds a maximum code rate of the second PUCCH, bits of the second UCI are discarded until the post-coding code rate of the second UCI does not exceed the maximum code rate of the second PUCCH.

The foregoing maximum code rate may be pre-configured, for example, configured in a network or agreed in a protocol.

In this implementation, a transmission code rate of the first UCI can be guaranteed, thereby ensuring that not only the UCI of the higher priority but also the UCI of the lower priority can be transmitted.

In the following, the HARQ-ACK of URLLC and the HARQ-ACK of eMBB are used as examples:

After the HARQ-ACK of URLLC and the HARQ-ACK of eMBB are multiplexed, if an actual transmission code rate of URLLC exceeds a maximum code rate configured for a PUCCH of URLLC, part or all of the HARQ-ACK of eMBB is discarded until the actual transmission code rate is lower than the maximum code rate configured for the PUCCH of URLLC. If an actual transmission code rate of the HARQ-ACK of eMBB is greater than a maximum code rate (if any) configured for a PUCCH of eMBB, some bits of the HARQ-ACK of eMBB are discarded (the discarding may be performed in a preconfigured order) until the actual transmission code rate is lower than the maximum code rate configured for the PUCCH, or all the bits of the HARQ-ACK of eMBB are discarded.

For example, the HARQ-ACK of URLLC and the HARQ-ACK of eMBB may be coded jointly. One method is: cascading the HARQ-ACK of URLLC and the HARQ-ACK of eMBB, and then performing coding, where a post-coding code rate is lower than the maximum code rate for the PUCCH of URLLC (for example, the maximum code rate is determined based on a high-level parameter PUCCH-MaxCodeRate). The PUCCH resource set is determined based on a total quantity of bits of the HARQ-ACK of URLLC and the HARQ-ACK of eMBB.

For another example, the HARQ-ACK of URLLC and the HARQ-ACK of eMBB are coded independently and use different code rates. In other words, a post-coding code rate of the HARQ-ACK of URLLC does not exceed the maximum code rate configured for the PUCCH of URLLC (for example, the maximum code rate is determined based on a high-level parameter PUCCH-MaxCodeRate 1, and corresponds to a maximum code rate for a PUCCH of a service having a high priority); and a post-coding code rate of the HARQ-ACK of eMBB does not exceed the maximum code rate configured for the PUCCH of eMBB (for example, the maximum code rate is determined based on a high-level parameter PUCCH-MaxCodeRate 2, and corresponds to a maximum code rate for a PUCCH of a service having a low priority).

Optionally, in a case that the first UCI and the second UCI are respectively and independently coded, post-coding bits of the first UCI are mapped onto first j symbol groups in the PUCCH resource.

In a case that the last symbol group of the first j symbol groups is completely occupied by the post-coding bits of the first UCI, post-coding bits of the second UCI are mapped onto the rest symbol groups in the PUCCH resource; or in a case that the post-coding bits of the first UCI cannot occupy all resource units of the last symbol group of the first j symbol groups, the post-coding bits of the first UCI are carried in all symbols in the last symbol group as uniformly distributed as possible, and the post-coding bits of the second UCI are mapped onto the rest resource units of the last symbol group of the first j symbol groups and the rest symbol groups in the PUCCH resource.

In the following, the HARQ-ACK of URLLC and the HARQ-ACK of eMBB are used as examples. For PUCCH resource mapping, in a case that the HARQ-ACK of URLLC and the HARQ-ACK of eMBB are independently coded, mapping is performed in a mapping manner in table 1.

TABLE 1

| PUCCH duration (symbols) | PUCCH DMRS symbol indices | Number of UCI symbol indices sets $N_{UCI}^{set}$ | $1^{st}$ UCI symbol indices set $S_{UCI}^{(1)}$ | $2^{nd}$ UCI symbol indices set $S_{UCI}^{(2)}$ | $3^{rd}$ UCI symbol indices set $S_{UCI}^{(3)}$ |
|---|---|---|---|---|---|
| 4 | {1} | 2 | {0, 2} | {3} | — |
| 4 | {0, 2} | 1 | {1, 3} | — | — |
| 5 | {0, 3} | 1 | {1, 2, 4} | — | — |
| 6 | {1, 4} | 1 | {0, 2, 3, 5} | — | — |
| 7 | {1, 4} | 2 | {0, 2, 3, 5} | {6} | — |
| 8 | {1, 5} | 2 | {0, 2, 4, 6} | {3, 7} | — |
| 9 | {1, 6} | 2 | {0, 2, 5, 7} | {3, 4, 8} | — |
| 10 | {2, 7} | 2 | {1, 3, 6, 8} | {0, 4, 5, 9} | — |
| 10 | {1, 3, 6, 8} | 1 | {0, 2, 4, 5, 7, 9} | — | — |
| 11 | {2, 7} | 3 | {1, 3, 6, 8} | {0, 4, 5, 9} | {10} |
| 11 | {1, 3, 6, 9} | 1 | {0, 2, 4, 5, 7, 8, 10} | — | — |
| 12 | {2, 8} | 3 | {1, 3, 7, 9} | {0, 4, 6, 10} | {5, 11} |
| 12 | {1, 4, 7, 10} | 1 | {0, 2, 3, 5, 6, 8, 9, 11} | — | — |

TABLE 1-continued

| PUCCH duration (symbols) | PUCCH DMRS symbol indices | Number of UCI symbol indices sets $N_{UCI}^{set}$ | $1^{st}$ UCI symbol indices set $S_{UCI}^{(1)}$ | $2^{nd}$ UCI symbol indices set $S_{UCI}^{(2)}$ | $3^{rd}$ UCI symbol indices set $S_{UCI}^{(3)}$ |
|---|---|---|---|---|---|
| 13 | {2, 9} | 3 | {1, 3, 8, 10} | {0, 4, 7, 11} | {5, 6, 12} |
| 13 | {1, 4, 7, 11} | 2 | {0, 2, 3, 5, 6, 8, 10, 12} | {9} | — |
| 14 | {3, 10} | 3 | {2, 4, 9, 11} | {1, 5, 8, 12} | {0, 6, 7, 13} |
| 14 | {1, 5, 8, 12} | 2 | {0, 2, 4, 6, 7, 9, 11, 13} | {3, 10} | — |

In the table, PUCCH duration (symbols) denotes a length of PUCCH duration symbols; PUCCH DMRS symbol indices $$N_{UCI}^{set}$$

denotes a PUCCH DMRS symbol index set $$N_{UCI}^{set};$$

$1^{st}$ UCI symbol indices set $$S_{UCI}^{(1)}$$

denotes a first UCI symbol index set; $2^{nd}$ UCI symbol indices set $$S_{UCI}^{(2)}$$

denotes a second UCI symbol index set; and $3^{rd}$ UCI symbol indices set $$S_{UCI}^{(3)}$$

denotes a third UCI symbol index set.

For example, post-coding bits of the HARQ-ACK of URLLC are first mapped onto $1^{st}$ to $(j-1)^{st}$ OFDM symbol groups to occupy all resource units. In a case that all resource units of the last OFDM symbol group of the $1^{st}$ to $(j-1)^{st}$ OFDM symbol groups are occupied, post-coding bits of a HARQ-ACK carrying eMBB occupy the rest OFDM symbol groups.

In a case that the post-coding bits of the HARQ-ACK of URLLC carried in the last OFDM symbol group of the $1^{st}$ to $(j-1)^{st}$ OFDM symbol groups cannot occupy all resource units, the post-coding bits of the HARQ-ACK of URLLC are carried in all OFDM symbols in the last OFDM symbol group of the $1^{st}$ to $(j-1)^{st}$ OFDM symbol groups as uniform as possible. Post-coding bits of the HARQ-ACK of eMBB are disposed at other locations of the last OFDM symbol group of the $1^{st}$ to $(j-1)^{st}$ OFDM symbol groups and the rest OFDM symbol groups. For example, after the post-coding bits of the HARQ-ACK of URLLC are mapped via the foregoing OFDM symbol groups, only 10 resource units are left, and the last OFDM symbol group includes four OFDM symbols, so that the 10 resource units are carried in all the OFDM symbols in the last OFDM symbol group of the $1^{st}$ to $(j-1)^{st}$ OFDM symbol groups as uniformly distributed as possible. For example, four of the resource units are respectively mapped onto first subcarriers of the four OFDM symbols, another four of the resource units are respectively mapped onto second subcarriers of the four OFDM symbols, and the rest two resource units are mapped onto third subcarriers of a first OFDM symbol and a second OFDM symbol. Because mapping is performed as uniform as possible, UCI transmission performance can be improved.

As an optional implementation, in a case that the first uplink channel and the second uplink channel are PUSCHs, the multiplexing the first UCI and the second UCI on a same channel for transmission includes:

multiplexing, for transmission, the first UCI and the second UCI on a first PUSCH carrying the first UCI.

In this implementation, in a case that the first UCI and the second UCI are carried in a PUSCH for transmission, the first UCI and the second UCI are multiplexed, for transmission, on a PUCCH resource of the first PUSCH carrying the first UCI. For example, in a case that the HARQ-ACK of URLLC and the HARQ-ACK of eMBB are transmitted on a PUSCH, the HARQ-ACK of URLLC and the HARQ-ACK of eMBB are multiplexed, for transmission, on a PUSCH carrying the HARQ-ACK of URLLC.

Optionally, quantities of modulation coding symbols occupied by the first UCI and the second UCI in each layer are determined based on a total bit quantity of the multiplexing.

The quantities of modulation coding symbols occupied by the first UCI and the second UCI in each layer may be quantities of modulation coding symbols occupied by the first UCI and the second UCI in each layer of a multiplexed PUSCH.

That quantities of modulation coding symbols occupied by the first UCI and the second UCI in each layer are determined based on a total bit quantity of the multiplexing may be: total quantities of modulation coding symbols occupied by the first UCI and the second UCI in each layer are determined based on the total bit quantity of the multiplexing. For example, the quantity of modulation coding symbols occupied by the first UCI in each layer is determined based on a bit quantity of the first UCI in the total bit quantity of the multiplexing; and the quantity of modulation coding symbols occupied by the second UCI in each layer is determined based on a bit quantity of the second UCI in the total bit quantity of the multiplexing.

It should be noted that, in this embodiment of the present disclosure, after the total bit quantity is determined, a manner of determining a quantity of modulation coding symbols in each layer is not limited. For example, the manner may be a manner, defined in a protocol, of determining a quantity of modulation coding symbols in each layer, or a manner, subsequently introduced in a protocol, of determining a quantity of modulation coding symbols in each layer. Because the quantity of modulation coding symbols in each layer can be determined based on the total bit quantity of the multiplexing, resource waste is avoided.

In addition, the total bit quantity may include:

the sum of a bit quantity of the first UCI and a bit quantity of the second UCI; or the sum of the bit quantity of the first UCI and a commuted bit quantity of the second UCI, where the commuted bit quantity of the second UCI is a function of the bit quantity of the second UCI.

The function may be obtained by multiplying an actual bit quantity by a commutation factor.

For the total bit quantity, refer to the corresponding description of the foregoing PUCCH implementation. Details are not described herein again.

In the following, that the first UCI is a HARQ-ACK of URLLC and the second UCI is a HARQ-ACK of eMBB is used as an example for description.

For respective coding for determining a bit quantity of modulation coding symbols occupied by the HARQ-ACK of URLLC in each layer and a bit quantity of modulation coding symbols occupied by the HARQ-ACK of eMBB in each layer, the total bit quantity is determined according to the following formula:

Quantity of bits of the HARQ-ACK of URLLC+Commuted quantity of bits of the HARQ-ACK of eMBB=Quantity of bits of the HARQ-ACK of URLLC+Quantity of bits of the HARQ-ACK of eMBB*gamma, where gamma is a commutation factor (also referred to as a scaling factor).

For example, a quantity of modulation coding symbols in each layer that are transmitted by a HARQ-ACK of a data-containing PUSCH is denoted by $Q'_{ACK1}+Q'_{ACK2}$, where $Q'_{ACK1}$ denotes a quantity of modulation coding symbols in each layer that are transmitted by the HARQ-ACK of URLLC, and $Q'_{ACK2}$ denotes a quantity of modulation coding symbols in each layer that are transmitted by the HARQ-ACK of eMBB.

In this case, for example, Gamma=

$$\beta_{offset1}^{PUSCH}/\beta_{offset2}^{PUSCH}, \text{ where } \beta_{offset2}^{PUSCH}$$

may be configured by a high layer or indicated by DCI.

$$Q'_{ACK1}=\min\left\{\left\lceil\frac{(O_{ACK1}+L_{ACK1})\cdot\beta_{offset1}^{PUSCH}\cdot\sum_{l=0}^{N_{symb,all}^{PUSCH}-1}M_{sc}^{UCI}(l)}{\sum_{r=0}^{C_{UL\text{-}SCH}-1}K_r}\right\rceil,\ \left\lceil\alpha\cdot\sum_{l=l_0}^{N_{symb,all}^{PUSCH}-1}M_{sc}^{UCI}(l)\right\rceil\right\}$$

-continued $$Q'_{ACK2}=\min\left\{\left\lceil\frac{(O_{ACK2}+L_{ACK2})\cdot\beta_{offset2}^{PUSCH}\cdot\sum_{l=0}^{N_{symb,all}^{PUSCH}-1}M_{sc}^{UCI}(l)}{\sum_{r=0}^{C_{UL\text{-}SCH}-1}K_r}\right\rceil,\ \left\lceil\alpha\cdot\sum_{l=l_0}^{N_{symb,all}^{PUSCH}-1}M_{sc}^{UCI}(l)\right\rceil-Q'_{ACK1}\right\}$$

where $O_{ACK1}$ denotes bits of the HARQ-ACK of URLLC; $O_{ACK2}$ denotes bits of the HARQ-ACK of eMBB; $L_{ACK1}$ denotes a cyclic redundancy check (CRC) length of URLLC; $L_{ACK2}$ denotes a cyclic redundancy check (CRC) length of eMBB;

$$\beta_{offset1}^{PUSCH}=\beta_{offset}^{HARQ\text{-}ACK1}$$

(for URLLC); and $$\beta_{offset2}^{PUSCH}=\beta_{offset}^{HARQ\text{-}ACK2}$$

(for eMBB).

$C_{UL\text{-}SCH}$ denotes a code block quantity of UL-SCH for transmission of a PUSCH;

$$M_{sc}^{PUSCH}$$

denotes a scheduling bandwidth for transmission of a PUSCH and is represented by a quantity of subcarriers;

$$M_{sc}^{PT\text{-}RS}(l)$$

denotes a quantity of subcarriers of an OFDM symbol 1 carrying phase-tracking reference signals (PTRS) during transmission of a PUSCH;

$$M_{sc}^{UCI}(l)$$

denotes a quantity of resource units that are in an OFDM symbol 1 and that are used for transmitting UCI, where $$l=0,1,2,\ldots,N_{symb,all}^{PUSCH}-1.$$

During transmission of the PUSCH, $$N_{symb,all}^{PUSCH}$$

denotes a total quantity of OFDM symbols of the PUSCH, including all OFDM symbols used for a DMRS.

For any OFDM symbol that is of the PUSCH and that carries a DMRS, $$M_{sc}^{UCI}(l) = 0.$$

For any OFDM symbol that is of the PUSCH and that does not carry a DMRS, $$M_{sc}^{UCI}(l) = M_{sc}^{PUSCH} - M_{sc}^{PT-RS}(l),$$

where α denotes a scaling parameter configured by a high layer.

$l_0$ denotes a symbol index of an OFDM symbol that is a first OFDM symbol after a first DMRS symbol and that does not carry a DMRS during transmission of the PUSCH.

However, a quantity of modulation coding symbols in each layer that are transmitted by a HARQ-ACK of a data-free PUSCH is denoted by $Q'_{ACK1}+Q'_{ACK2}$, where $Q'_{ACK1}$ denotes a quantity of modulation coding symbols in each layer that are transmitted by the HARQ-ACK of URLLC, and $Q'_{ACK2}$ denotes a quantity of modulation coding symbols in each layer that are transmitted by the HARQ-ACK of eMBB, where $$Q'_{ACK1} = \min\left\{\left\lceil \frac{(O_{ACK1} + L_{ACK1}) \cdot \beta_{offset1}^{PUSCH}}{R_1 * Q_{m1}} \right\rceil, \left\lceil \alpha \cdot \sum_{l=l_0}^{N_{symb,all}^{PUSCH}-1} M_{sc}^{UCI}(l) \right\rceil\right\}$$

$$Q'_{ACK2} = \min\left\{\left\lceil \frac{(O_{ACK2} + L_{ACK2}) \cdot \beta_{offset2}^{PUSCH}}{R_1 * Q_{m1}} \right\rceil, \left\lceil \alpha \cdot \sum_{l=l_0}^{N_{symb,all}^{PUSCH}-1} M_{sc}^{UCI}(l) \right\rceil - Q'_{ACK1}\right\}$$

R1 and Qm1 respectively denote a code rate and a modulation mode of the PUSCH of URLLC;

$$\beta_{offset1}^{PUSCH} = \beta_{offset}^{HARQ-ACK1}$$

(for URLLC); and $$\beta_{offset2}^{PUSCH} = \beta_{offset1}^{HARQ-ACK2}$$

(for eMBB).

For example, UCI is a HARQ-ACK. When a PUCCH carrying a HARQ-ACK of a service having a high priority and a PUCCH carrying a HARQ-ACK of a service having a low priority are overlapped, the following can be implemented in this embodiment of the present disclosure:

in a case that a high-priority HARQ-ACK and a low-priority HARQ-ACK are transmitted on a PUCCH, a high-priority PUCCH resource is used to carry the high-priority HARQ-ACK and the low-priority HARQ-ACK, where the resource is determined based on a post-multiplexing total bit quantity.

The high-priority HARQ-ACK and the low-priority HARQ-ACK are coded respectively and independently. Different code rates or a same code rate may be used.

A PUCCH resource set is determined based on the following:

a total bit quantity of the high-priority HARQ-ACK and the low-priority HARQ-ACK, or the sum of a bit quantity of the high-priority HARQ-ACK and a commuted bit quantity of the low-priority HARQ-ACK.

In a case that a high-priority HARQ-ACK and a low-priority HARQ-ACK are transmitted on a PUSCH, a high-priority PUSCH is used, and quantities of modulation coding symbols occupied by the high-priority HARQ-ACK and the low-priority HARQ-ACK on each layer are determined based on the following:

a total bit quantity of the high-priority HARQ-ACK and the low-priority HARQ-ACK, or the sum of a bit quantity of the high-priority HARQ-ACK and a commuted bit quantity of the HARQ-ACK of eMBB.

In this embodiment of the present disclosure, UCI transmission conflict can be avoided, to improve a UCI transmission effect of a terminal.

For example, a conflict in simultaneous transmission of HARQ-ACKs on a PUCCH of URLLC and a PUCCH of eMBB can be resolved, to ensure transmission reliability of a URLLC service and transmission efficiency of an eMBB service.

Figure 4:
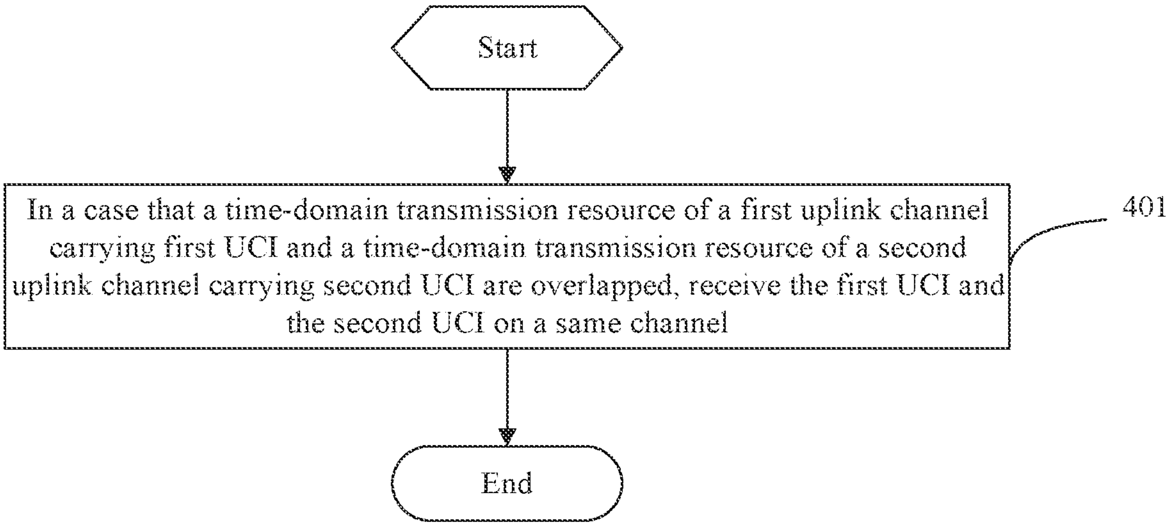
FIG. 4 is a flowchart of a UCI receiving method according to an embodiment of the present disclosure.

FIG. 4 is a flowchart of a UCI receiving method according to an embodiment of the present disclosure. The method is applied to a network device, and as shown in FIG. 4, includes the following steps:

Step 401: In a case that a time-domain transmission resource of a first uplink channel carrying first UCI and a time-domain transmission resource of a second uplink channel carrying second UCI are overlapped, receive the first UCI and the second UCI on a same channel.

Optionally, the same channel is the first uplink channel.

Optionally, a priority of the first UCI is higher than a priority of the second UCI.

Optionally, DCI corresponding to the first UCI is:

DCI with a specific format, DCI scrambled with a specific radio network temporary identifier (RNTI), or DCI configured with a specific MCS table.

Optionally, in a case that the first uplink channel is a first PUCCH and the second uplink channel is a second PUCCH, the receiving the first UCI and the second UCI on a same channel includes:

receiving the first UCI and the second UCI on a PUCCH resource of a first PUCCH carrying the first UCI.

Optionally, the PUCCH resource is determined based on a total bit quantity of multiplexing of the first UCI and the second UCI.

Optionally, in a case that the first uplink channel and the second uplink channel are PUSCHs, the receiving the first UCI and the second UCI on a same channel includes:

receiving the first UCI and the second UCI on a first PUSCH carrying the first UCI.

Optionally, quantities of modulation coding symbols occupied by the first UCI and the second UCI in each layer are determined based on a total bit quantity of multiplexing of the first UCI and the second UCI.

Optionally, the total bit quantity includes:

the sum of a bit quantity of the first UCI and a bit quantity of the second UCI; or the sum of the bit quantity of the first UCI and a commuted bit quantity of the second UCI, where the commuted bit quantity of the second UCI is a function of the bit quantity of the second UCI.

Optionally, the function is obtained by multiplying an actual bit quantity by a commutation factor.

It should be noted that this embodiment is used as an implementation of the network device corresponding to the embodiment shown in FIG. 2. For a specific implementation of this embodiment, refer to the related descriptions of the embodiment shown in FIG. 2. To avoid repeated descriptions, details are not described again in this embodiment. In this embodiment, in addition, a UCI transmission conflict can be avoided, to improve a UCI transmission effect of a terminal.

Figure 5:
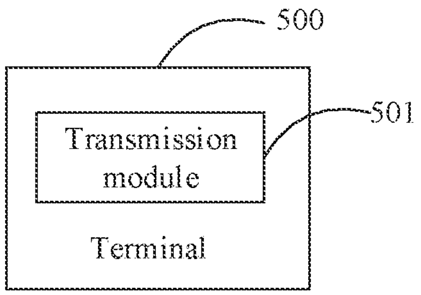
FIG. 5 is a structural diagram of a terminal according to an embodiment of the present disclosure.

Referring to FIG. 5, FIG. 5 is a structural diagram of a terminal according to an embodiment of the present disclosure. As shown in FIG. 5, the terminal 500 includes:

a transmission module 501, configured to: in a case that a time-domain transmission resource of a first uplink channel carrying first UCI and a time-domain transmission resource of a second uplink channel carrying second UCI are overlapped, multiplex the first UCI and the second UCI on a same channel for transmission.

Optionally, the same channel is the first uplink channel.

Optionally, a priority of the first UCI is higher than a priority of the second UCI.

Optionally, DCI corresponding to the first UCI is:

DCI with a specific format, DCI scrambled with a specific RNTI, or DCI configured with a specific MCS table.

Optionally, in a case that the first uplink channel is a first physical uplink control channel (PUCCH) and the second uplink channel is a second PUCCH, the transmission module 501 is configured to: in the case that the time-domain transmission resource of the first uplink channel carrying the first UCI and the time-domain transmission resource of the second uplink channel carrying the second UCI are overlapped, multiplex the first UCI and the second UCI on a PUCCH resource of the first PUCCH carrying the first UCI for transmission.

Optionally, the PUCCH resource is determined based on a total bit quantity of the multiplexing.

Optionally, in a case that the first uplink channel and the second uplink channel are physical uplink shared channels (PUSCHs), the transmission module 501 is configured to: in the case that the time-domain transmission resource of the first uplink channel carrying the first UCI and the time-domain transmission resource of the second uplink channel carrying the second UCI are overlapped, multiplex the first UCI and the second UCI on a first PUSCH carrying the first UCI for transmission.

Optionally, quantities of modulation coding symbols occupied by the first UCI and the second UCI in each layer are determined based on a total bit quantity of the multiplexing.

Optionally, the total bit quantity includes:

the sum of a bit quantity of the first UCI and a bit quantity of the second UCI; or the sum of the bit quantity of the first UCI and a commuted bit quantity of the second UCI, where the commuted bit quantity of the second UCI is a function of the bit quantity of the second UCI.

Optionally, the function is obtained by multiplying an actual bit quantity by a commutation factor.

The terminal provided in this embodiment of the present disclosure can implement processes implemented by the terminal in the method embodiment of FIG. 2. To avoid repetition, details are not described herein again. In addition, a UCI transmission conflict can be avoided, to improve a UCI transmission effect of a terminal.

Figure 6:
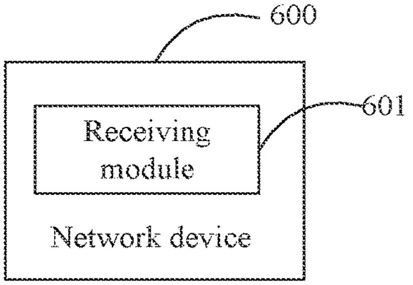
FIG. 6 is a structural diagram of a network device according to an embodiment of the present disclosure.

FIG. 6 is a structural diagram of a network device according to an embodiment of the present disclosure. As shown in FIG. 6, the network device 600 includes:

a receiving module 601, configured to: in a case that a time-domain transmission resource of a first uplink channel carrying first UCI and a time-domain transmission resource of a second uplink channel carrying second UCI are overlapped, receive the first UCI and the second UCI on a same channel.

Optionally, the same channel is the first uplink channel.

Optionally, a priority of the first UCI is higher than a priority of the second UCI.

Optionally, DCI corresponding to the first UCI is:

DCI with a specific format, DCI scrambled with a specific radio network temporary identifier (RNTI), or DCI configured with a specific MCS table.

Optionally, in a case that the first uplink channel is a first PUCCH and the second uplink channel is a second PUCCH, the receiving module 601 is configured to: in the case that the time-domain transmission resource of the first uplink channel carrying the first UCI and the time-domain transmission resource of the second uplink channel carrying the second UCI are overlapped, receive the first UCI and the second UCI on a PUCCH resource of the first PUCCH carrying the first UCI.

Optionally, the PUCCH resource is determined based on a total bit quantity of multiplexing of the first UCI and the second UCI.

Optionally, in a case that the first uplink channel and the second uplink channel are PUSCHs, the receiving module 601 is configured to: in the case that the time-domain transmission resource of the first uplink channel carrying the first UCI and the time-domain transmission resource of the second uplink channel carrying the second UCI are overlapped, receive the first UCI and the second UCI on a first PUSCH carrying the first UCI.

Optionally, quantities of modulation coding symbols occupied by the first UCI and the second UCI in each layer are determined based on a total bit quantity of multiplexing of the first UCI and the second UCI.

Optionally, the total bit quantity includes:

the sum of a bit quantity of the first UCI and a bit quantity of the second UCI; or the sum of the bit quantity of the first UCI and a commuted bit quantity of the second UCI, where the commuted bit quantity of the second UCI is a function of the bit quantity of the second UCI.

Optionally, the function is obtained by multiplying an actual bit quantity by a commutation factor.

The network device provided in this embodiment of the present disclosure can implement the processes implemented by the network device in the method embodiment of FIG. 4. To avoid repetition, details are not described herein again. In addition, a UCI transmission conflict can be avoided, to improve a UCI transmission effect of a terminal.

Figure 7:
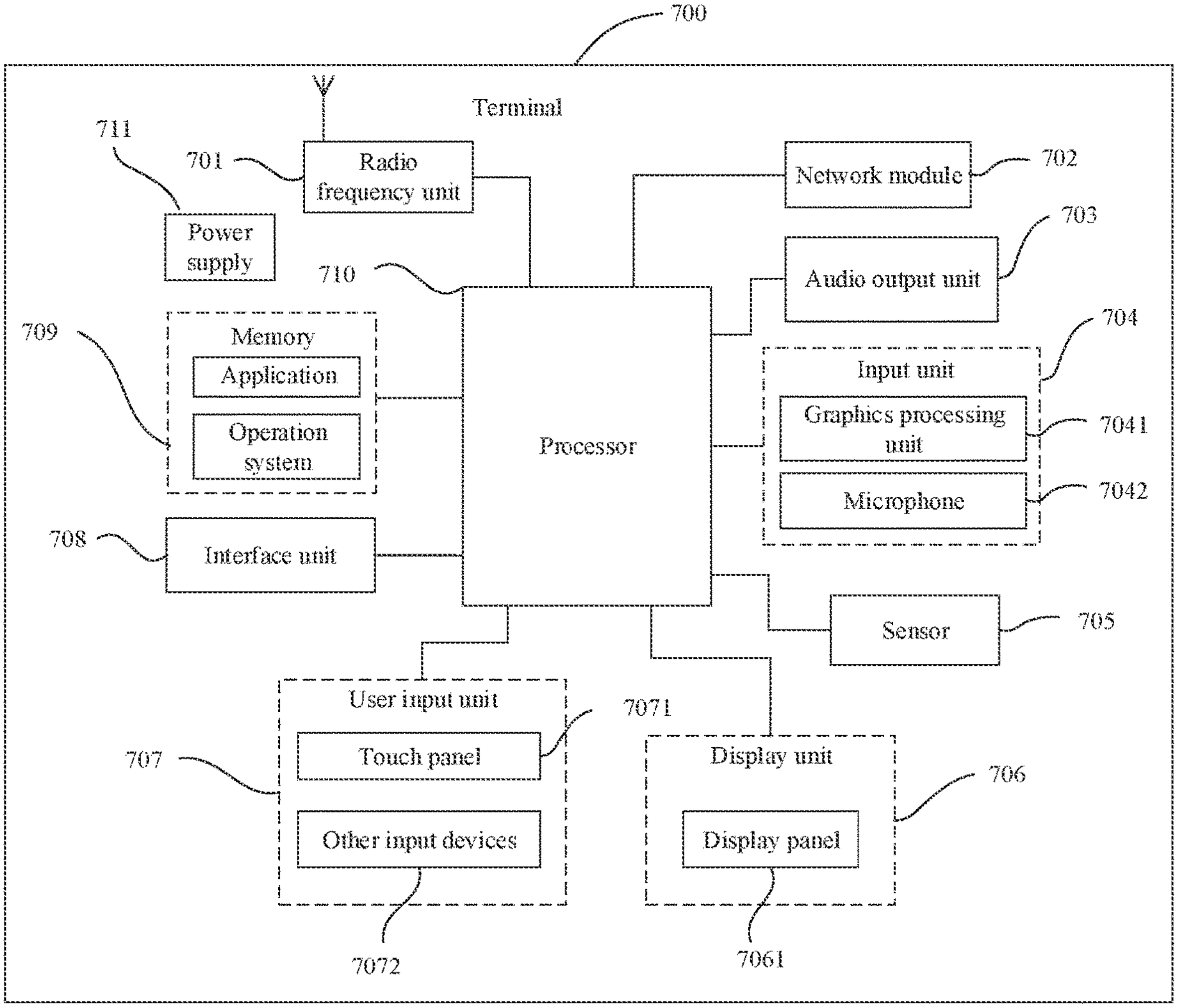
FIG. 7 is a structural diagram of another terminal according to an embodiment of the present disclosure.

FIG. 7 is a schematic structural diagram of hardware of a terminal implementing embodiments of the present disclosure. The terminal 700 includes but is not limited to: a radio frequency unit 701, a network module 702, an audio output unit 703, an input unit 704, a sensor 705, a display unit 706, a user input unit 707, an interface unit 708, a memory 709, a processor 710, a power supply 711, and other components. Those skilled in the art may understand that the terminal structure shown in FIG. 7 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a notebook computer, a palmtop computer, an in-vehicle terminal, a robot, a wearable device, a pedometer, and the like.

The radio frequency unit 701 is configured to: in a case that a time-domain transmission resource of a first uplink channel carrying first UCI and a time-domain transmission resource of a second uplink channel carrying second UCI are overlapped, multiplex the first UCI and the second UCI on a same channel for transmission.

Optionally, the same channel is the first uplink channel.

Optionally, a priority of the first UCI is higher than a priority of the second UCI.

Optionally, downlink control information (DCI) corresponding to the first UCI is:

DCI with a specific format, DCI scrambled with a specific radio network temporary identifier (RNTI), or DCI configured with a specific MCS table.

Optionally, in a case that the first uplink channel is a first physical uplink control channel (PUCCH) and the second uplink channel is a second PUCCH, the multiplexing the first UCI and the second UCI on a same channel for transmission includes:

multiplexing, for transmission, the first UCI and the second UCI on a PUCCH resource of a first PUCCH carrying the first UCI.

Optionally, the PUCCH resource is determined based on a total bit quantity of the multiplexing.

Optionally, in a case that the first uplink channel and the second uplink channel are physical uplink shared channels (PUSCHs), the multiplexing the first UCI and the second UCI on a same channel for transmission includes:

multiplexing, for transmission, the first UCI and the second UCI on a first PUSCH carrying the first UCI.

Optionally, quantities of modulation coding symbols occupied by the first UCI and the second UCI in each layer are determined based on a total bit quantity of the multiplexing.

Optionally, the total bit quantity includes:

the sum of a bit quantity of the first UCI and a bit quantity of the second UCI; or the sum of the bit quantity of the first UCI and a commuted bit quantity of the second UCI, where the commuted bit quantity of the second UCI is a function of the bit quantity of the second UCI.

Optionally, the function is obtained by multiplying an actual bit quantity by a commutation factor.

The terminal can avoid a UCI transmission conflict, to improve a UCI transmission effect of the terminal.

It should be understood that, in this embodiment of the present disclosure, the radio frequency unit 701 may be configured to receive and send signals in an information receiving and sending process or a calling process. Specifically, after receiving downlink data from a base station, the radio frequency unit 701 sends the downlink data to the processor 710 for processing, and sends uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device via a wireless communications system.

The terminal provides a user with wireless broadband Internet access by using the network module 702, for example, helping the user send and receive emails, browse web pages, and access streaming media.

The audio output unit 703 may convert audio data received by the radio frequency unit 701 or the network module 702 or stored in the memory 709 into an audio signal, and output the audio signal as sound. In addition, the audio output unit 703 may further provide audio output (for example, call signal receiving sound or message receiving sound) related to a specific function performed by the terminal 700. The audio output unit 703 includes a loudspeaker, a buzzer, a receiver, and the like.

The input unit 704 is configured to receive an audio signal or a video signal. The input unit 704 may include a graphics processing unit (GPU) 7041 and a microphone 7042. The graphics processing unit 7041 processes image data of a static picture or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 can receive a sound, and can process such a sound to obtain audio data. The processed audio data may be converted into a format output which is sent to a mobile communication base station by the radio frequency unit 701 under a telephone conversation mode.

The terminal 700 further includes at least one sensor 705, such as an optional sensor, a motion sensor, and another sensor. Specifically, the light sensor includes an ambient light sensor and a proximity sensor. The ambient light sensor can adjust brightness of a display panel 7061 based on brightness of ambient light. The proximity sensor can turn off the display panel 7061 and/or backlight when the terminal 700 approaches an ear. As a type of the motion sensor, an accelerometer sensor may detect magnitude of an acceleration in each direction (generally three axes), and may detect magnitude and a direction of gravity when being static. The accelerometer sensor may be used for recognizing terminal gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. This is not described herein again.

The display unit 706 is configured to display information entered by the user or information provided for the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information and generate key signal input related to user settings and function control of the terminal. Specifically, the user input unit 707 includes a touch panel 7071 and other input devices 7072. The touch panel 7071, also called a touch screen, can collect a touch operation of the user on or near the touch panel 7071 (for example, the user uses any suitable object or accessory such as a finger or a stylus to operate on or near the touch panel 7071). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 710, and receives and executes a command sent by the processor 710. In addition, the touch panel 7071 may be achieved by a variety of types, such as a resistance type, a capacitance type, an infrared ray, and a surface acoustic wave. In addition to the touch panel 7071, the user input unit 707 may further include other input devices 7072. Specifically, the other input devices 7072 may include but are not limited to a physical keyboard, a functional key (such as a volume control key or a power on/off key), a trackball, a mouse, and a joystick. Details are not described herein.

Further, the touch panel 7071 may cover the display panel 7061. When detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, the touch panel 7071 and the display panel 7061 are used as two independent components to implement input and output functions of the terminal. However, in some embodiments, the touch panel 7071 and the display panel 7061 may be integrated to implement the input and output functions of the terminal. This is not specifically limited herein.

The interface unit 708 is an interface connecting an external apparatus to the user equipment 700. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 708 may be configured to receive an input (for example, data information and power) from an external apparatus and transmit the received input to one or more elements within the terminal 700, or may be configured to transmit data between the terminal 700 and the external apparatus.

The memory 709 may be configured to store software programs and various data. The memory 709 may mainly include a stored program region and a stored data region, where the stored program region may store an application program (such as a sound playing function and an image playing function) required by an operation system and at least one function. The stored data region may store data (such as audio data, a telephone book) created based on the use of a mobile phone. In addition, the memory 709 may include a high-speed random access memory, further include a nonvolatile memory, for example, at least one disk storage device, a flash memory or other volatile solid storage devices.

The processor 710 is a control center of the terminal, and connects all parts of the entire terminal through various interfaces and lines. By running or executing a software program and/or a module stored in the memory 709 and invoking data stored in the memory 709, the processor 710 performs various functions of the terminal and data processing, to perform overall monitoring on the terminal. The processor 710 may include one or more processing units. Optionally, the processor 710 may integrate an application processor with a modem processor. The application processor mainly processes the operation system, a user interface, the application program, and the like. The modem processor mainly processes wireless communication. It should be understood that the modem processor may be not integrated in the processor 710.

The user equipment 700 may further include a power supply 711 (such as a battery) that supplies power to each component. Optionally, the power supply 711 may be logically connected to the processor 710 by using a power management system, to implement functions such as charging, discharging, and power consumption management by using the power management system.

In addition, the user equipment 700 includes some function modules not shown, and details are not described herein again.

Optionally, an embodiment of the present disclosure further provides a terminal, including a processor 710, a memory 709, a computer program stored in the memory 709 and executable on the processor 710. When the computer program is executed by the processor 710, the processes of the foregoing UCI transmission method embodiment are implemented, with the same technical effect achieved. To avoid repetition, details are not described herein again.

Figure 8:
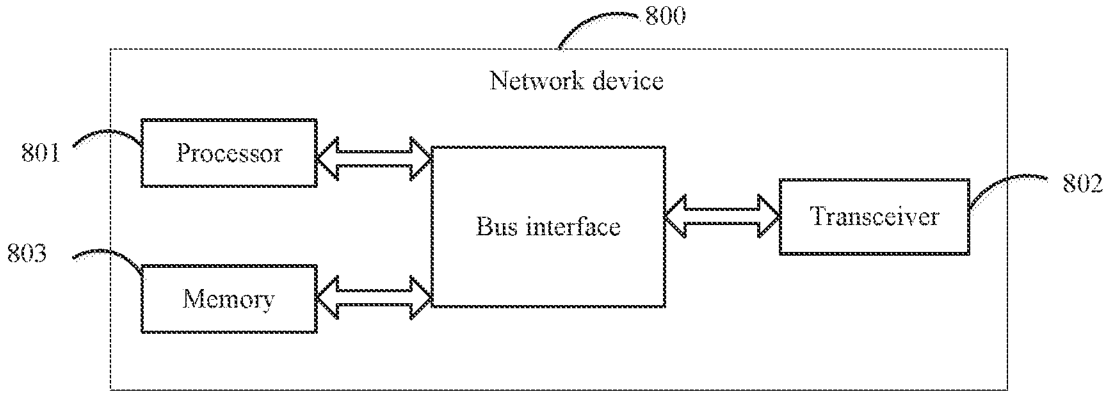
FIG. 8 is a structural diagram of another network device according to an embodiment of the present disclosure.

Referring to FIG. 8, FIG. 8 is a structural diagram of another network device according to an embodiment of the present disclosure. As shown in FIG. 8, the network device 800 includes: a processor 801, a transceiver 802, a memory 803 and a bus interface.

The transceiver 802 is configured to: in a case that a time-domain transmission resource of a first uplink channel carrying first UCI and a time-domain transmission resource of a second uplink channel carrying second UCI are overlapped, receive the first UCI and the second UCI on a same channel.

Optionally, the same channel is the first uplink channel.

Optionally, a priority of the first UCI is higher than a priority of the second UCI.

Optionally, DCI corresponding to the first UCI is:

DCI with a specific format, DCI scrambled with a specific RNTI, or DCI configured with a specific MCS table.

Optionally, in a case that the first uplink channel is a first PUCCH and the second uplink channel is a second PUCCH, the receiving the first UCI and the second UCI on a same channel includes:

receiving the first UCI and the second UCI on a PUCCH resource of a first PUCCH carrying the first UCI.

Optionally, the PUCCH resource is determined based on a total bit quantity of multiplexing of the first UCI and the second UCI.

Optionally, in a case that the first uplink channel and the second uplink channel are PUSCHs, the receiving the first UCI and the second UCI on a same channel includes:

receiving the first UCI and the second UCI on a first PUSCH carrying the first UCI.

Optionally, quantities of modulation coding symbols occupied by the first UCI and the second UCI in each layer are determined based on a total bit quantity of multiplexing of the first UCI and the second UCI.

Optionally, the total bit quantity includes:

the sum of a bit quantity of the first UCI and a bit quantity of the second UCI; or the sum of the bit quantity of the first UCI and a commuted bit quantity of the second UCI, where the commuted bit quantity of the second UCI is a function of the bit quantity of the second UCI.

Optionally, the function is obtained by multiplying an actual bit quantity by a commutation factor.

The network device can avoid a UCI transmission conflict, to improve a UCI transmission effect of a terminal.

The transceiver 802 is configured to receive and send data under the control of the processor 801. The transceiver 802 includes at least two antenna ports.

In FIG. 8, a bus architecture may include any quantity of interconnected buses and bridges, which are specifically connected together by one or more processors represented by the processor 801 and various circuits of a memory represented by the memory 803. The bus architecture may further link various other circuits such as those of a peripheral device, a voltage regulator, and a power management circuit. These are well known in the art, and therefore are not further described in this specification. The bus interface provides an interface. The transceiver 802 may include a plurality of elements, that is, include a transmitter and a receiver, and provide units for communication with various other apparatuses on a transmission medium. For different user equipment, a user interface 804 may also be an interface capable of connecting externally and internally to a required device. The connected device includes but is not limited to a keypad, a display, a speaker, a microphone, a joystick, and the like.

The processor 801 is responsible for management of the bus architecture and general processing. The memory 803 may store data used by the processor 801 when operations are performed.

Optionally, an embodiment of the present disclosure further provides a network device, including a processor 801, a memory 803, and a computer program stored in the memory 803 and executable on the processor 801. When the computer program is executed by the processor 801, the processes of the foregoing UCI receiving method embodiment are implemented, with the same technical effect achieved. To avoid repetition, details are not described herein again.

An embodiment of the present disclosure further provide a computer-readable storage medium. The computer-readable storage medium stores a computer program, and when the computer program is executed by a processor, the UCI transmission method or the UCI receiving method provided in the embodiments of the present disclosure is implemented, with the same technical effect achieved. To avoid repetition, details are not described herein again. The computer-readable storage medium may be a read-only memory (ROM), a random access memory (RAM), a magnetic disk, a compact disc, or the like.

It should be noted that in this specification, the term “include”, “including”, or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement “including a . . . ” does not exclude another same element in a process, method, article, or apparatus that includes the element.

According to the foregoing descriptions of the implementations, a person skilled in the art may clearly understand that the foregoing method embodiments may be implemented by using software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. An uplink control information (UCI) transmission method, applied to a terminal and comprising:

in response to a time-domain transmission resource of a first physical uplink control channel (PUCCH) for carrying first UCI with a high priority and a time-domain transmission resource of a second PUCCH for carrying second UCI with a low priority being overlapped, determining to multiplex the first UCI and the second UCI on a single PUCCH for transmission, the single PUCCH being the first PUCCH; and determining a second resource of the first PUCCH for the multiplexed first UCI and second UCI based on a total bit quantity of the first UCI and the second UCI comprising a sum of a bit quantity of the first UCI and a commuted bit quantity of the second UCI, wherein the commuted bit quantity of the second UCI is a function of an actual bit quantity of the second UCI, and wherein the function is obtained by multiplying the actual bit quantity of the second UCI by a commutation factor;

wherein the determined second resource of the first PUCCH for the multiplexed first UCI and second UCI comprises a quantity of physical resource blocks (PRBs), or a quantity of symbol groups;

the priority of the first UCI is determined based on a downlink control information (DCI) corresponding to the first UCI, and the priority of the second UCI is determined based on a DCI corresponding to the second UCI.

2. The method according to claim 1, wherein the DCI corresponding to the first UCI is:

DCI with a specific format, DCI scrambled with a specific radio network temporary identifier (RNTI), or DCI configured with a specific modulation and coding scheme (MCS) table.

3. A UCI receiving method, applied to a network device and comprising:

in response to a time-domain transmission resource of a first physical uplink control channel (PUCCH) for carrying first UCI with a high priority and a time-domain transmission resource of a second PUCCH for carrying second UCI with a low priority being overlapped, receiving the multiplexed first UCI and second UCI on a single PUCCH, the single PUCCH being the first PUCCH;

wherein a second resource of the first PUCCH for the multiplexed first UCI and second UCI is determined based on a total bit quantity of the first UCI and the second UCI comprising a sum of a bit quantity of the first UCI and a commuted bit quantity of the second-UCI UCI, wherein the commuted bit quantity of the second UCI is a function of an actual bit quantity of the second UCI, and wherein the function is obtained by multiplying the actual bit quantity of the second UCI by a commutation factor;

wherein the determined second resource of the first PUCCH for the multiplexed first UCI and second UCI comprises a quantity of physical resource blocks (PRBs), or a quantity of symbol groups;

the priority of the first UCI is determined based on a downlink control information (DCI) corresponding to the first UCI, and the priority of the second UCI is determined based on a DCI corresponding to the second UCI.

4. The method according to claim 3, wherein the DCI corresponding to the first UCI is:

DCI with a specific format, DCI scrambled with a specific RNTI, or DCI configured with a specific MCS table.

5. A terminal, comprising a memory, a processor, and a program stored in the memory and executable on the processor, wherein the program is executed by the processor to implement:

in response to a time-domain transmission resource of a first physical uplink control channel (PUCCH) for carrying first UCI with a high priority and a time-domain transmission resource of a second PUCCH for carrying second UCI with a low priority being overlapped, determining to multiplex the first UCI and the second UCI on a single PUCCH for transmission, the single PUCCH being the first PUCCH;

determining a second resource of the first PUCCH for the multiplexed first UCI and second UCI based on a total bit quantity of the first UCI and the second UCI comprising a sum of a bit quantity of the first UCI and a commuted bit quantity of the second-UCI UCI, wherein the commuted bit quantity of the second UCI is a function of an actual bit quantity of the second UCI, and wherein the function is obtained by multiplying the actual bit quantity of the second UCI by a commutation factor;

wherein the determined second resource of the first PUCCH for the multiplexed first UCI and second UCI comprises a quantity of physical resource blocks (PRBs), or a quantity of symbol groups;

the priority of the first UCI is determined based on a downlink control information (DCI) corresponding to the first UCI, and the priority of the second UCI is determined based on a DCI corresponding to the second UCI.

* * * * *